(12) United States Patent
Suzuki et al.

(10) Patent No.: US 11,654,881 B2
(45) Date of Patent: May 23, 2023

(54) CONTROL APPARATUS

(71) Applicant: SUBARU CORPORATION, Tokyo (JP)

(72) Inventors: Hiroyuki Suzuki, Tokyo (JP); Itaru Seta, Tokyo (JP); Yosuke Ohtomo, Tokyo (JP); Masaki Komuro, Tokyo (JP); Shinya Sagawa, Tokyo (JP); Takashi Kono, Tokyo (JP); Kazuki Makino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 33 days.

(21) Appl. No.: 17/502,192

(22) Filed: Oct. 15, 2021

(65) Prior Publication Data

US 2022/0118964 A1  Apr. 21, 2022

(30) Foreign Application Priority Data

Oct. 16, 2020 (JP) .............................. JP2020-174456

(51) Int. Cl.
  *B60W 20/10*  (2016.01)
  *B60K 6/365*  (2007.10)
  *G07C 5/08*  (2006.01)
  *B60W 10/06*  (2006.01)
  *B60W 10/08*  (2006.01)
  (Continued)

(52) U.S. Cl.
  CPC .............. *B60W 20/10* (2013.01); *B60K 6/26* (2013.01); *B60K 6/365* (2013.01); *B60W 10/06* (2013.01); *B60W 10/08* (2013.01); *F02D 31/007* (2013.01); *G07C 5/0808* (2013.01); *B60W 2510/0638* (2013.01); *B60W 2510/081* (2013.01); *B60W 2710/0616* (2013.01);
  (Continued)

(58) Field of Classification Search
  CPC ...... B60W 20/10; B60W 10/06; B60W 10/08; B60W 2510/081; B60W 2510/083; B60W 2710/081; B60W 2710/0616; B60W 2710/0644; B60W 2710/083; B60W 50/04; B60K 6/26; B60K 6/365; B60K 6/445; F02D 31/007; G07C 5/0808
  See application file for complete search history.

(56) References Cited

U.S. PATENT DOCUMENTS

2009/0195203 A1*  8/2009  Yurgil ................. B60W 30/184
                                                903/930
2016/0244051 A1*  8/2016  Ikeda ....................... B60K 6/36
                              (Continued)

FOREIGN PATENT DOCUMENTS

JP  2019-116153 A  7/2019

*Primary Examiner* — George C Jin
(74) *Attorney, Agent, or Firm* — Troutman Pepper Hamilton Sanders LLP

(57) ABSTRACT

A control apparatus is configured to control a vehicle. The vehicle includes an engine, a generator configured to generate electric power by using motive power outputted from the engine, and a drive motor coupled to a drive wheel. The engine, the generator, and the drive motor are coupled to each other via a planetary gear mechanism. The control apparatus includes a processor configured to diagnose a state of at least one of the engine, the generator, or the drive motor on the basis of a relationship between a rotational speed of the engine, a rotational speed of the generator, and a rotational speed of the drive motor.

13 Claims, 10 Drawing Sheets

(51) Int. Cl.
 *B60K 6/26* (2007.10)
 *F02D 31/00* (2006.01)
(52) U.S. Cl.
 CPC ............... *B60W 2710/0644* (2013.01); *B60W 2710/081* (2013.01); *B60Y 2200/92* (2013.01); *F02D 2200/101* (2013.01)

(56) References Cited

U.S. PATENT DOCUMENTS

| | | | |
|---|---|---|---|
| 2018/0050680 A1* | 2/2018 | Kim | F16D 48/10 |
| 2019/0001963 A1* | 1/2019 | Kim | B60W 20/20 |
| 2019/0118800 A1* | 4/2019 | Cho | B60W 10/196 |
| 2019/0152470 A1* | 5/2019 | Liu | B60W 10/06 |

* cited by examiner

CONTROL APPARATUS

CROSS-REFERENCE TO RELATED APPLICATION

The present application claims priority from Japanese Patent Application No. 2020-174456 filed on Oct. 16, 2020, the entire contents of which are hereby incorporated by reference.

BACKGROUND

The technology relates to a control apparatus.

A hybrid vehicle including an engine and a drive motor as drive sources has been widely used in recent years. In such a vehicle, the engine, a generator generating electric power by using motive power outputted from the engine, and the drive motor coupled to a drive wheel may be coupled to each other via a planetary gear mechanism serving as a power split mechanism. For example, reference is made to Japanese Unexamined Patent Application Publication No. 2019-116153. The planetary gear mechanism may divide the motive power outputted from the engine, and transmit the divided motive power to the generator and the drive motor.

SUMMARY

An aspect of the technology provides a control apparatus configured to control a vehicle. The vehicle includes an engine, a generator, and a drive motor. The generator is configured to generate electric power by using motive power outputted from the engine. The drive motor is coupled to a drive wheel. The engine, the generator, and the drive motor are coupled to each other via a planetary gear mechanism. The control apparatus includes a processor. The processor is configured to diagnose a state of at least one of the engine, the generator, or the drive motor on the basis of a relationship between a rotational speed of the engine, a rotational speed of the generator, and a rotational speed of the drive motor.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
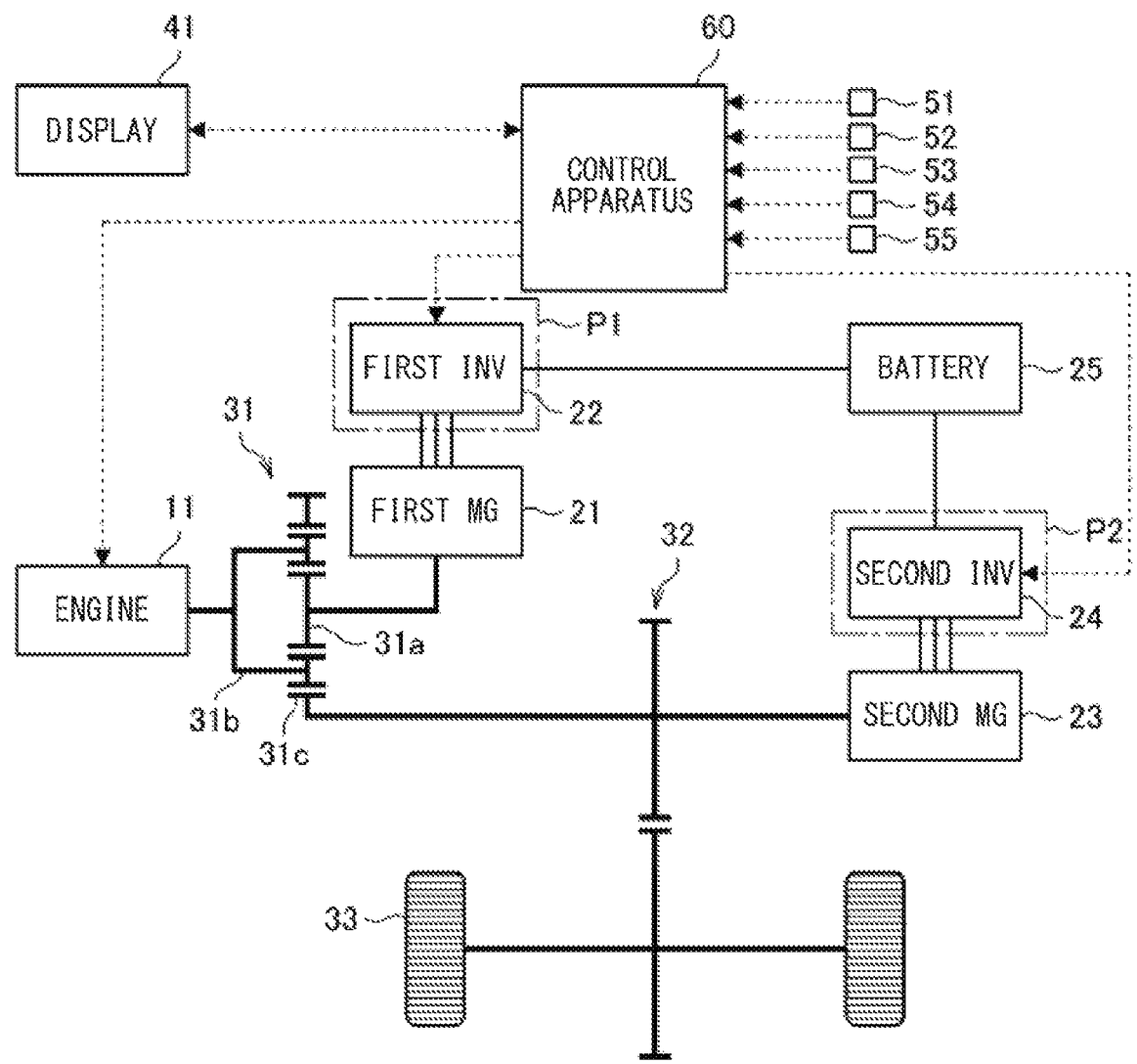
FIG. 1 is a diagram schematically illustrating an example of an outline configuration of a vehicle in one example embodiment of the technology.

As described above, various pieces of equipment, including an engine, a generator, and a drive motor, may be mounted on a hybrid vehicle. In the event that any of such pieces of equipment stops operating normally, it can become difficult for the vehicle to continue traveling. In such a case, the vehicle has to be brought to, for example, a dealer for inspection and repair. It is thus desired to appropriately diagnose a state of equipment in the vehicle.

It is desirable to provide a control apparatus that makes it possible to appropriately diagnose a state of equipment mounted on a vehicle.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

A configuration of a vehicle 1 in an example embodiment of the technology will now be described with reference to FIGS. 1 to 3.

FIG. 1 schematically illustrates an outline configuration of the vehicle 1. Referring to FIG. 1, the vehicle 1 may include an engine 11, a first motor generator 21, a first inverter 22, a second motor generator 23, a second inverter 24, a battery 25, a planetary gear mechanism 31, a group of gears 32, a drive wheel 33, a display 41, a vehicle speed sensor 51, an engine rotational speed sensor 52, a gradient sensor 53, a first temperature sensor 54, a second temperature sensor 55, and a control apparatus 60. The planetary gear mechanism 31 may include a sun gear 31a, a carrier 31b, and a ring gear 31c. The first motor generator 21, the first inverter 22, the second motor generator 23, and the second inverter 24 correspond to a first MG, a first INV, a second MG, and a second INV in FIG. 1, respectively.

In one embodiment, the first motor generator 21 may serve as a "generator". In one embodiment, the second motor generator 23 may serve as a "drive motor".

The engine 11 may be an internal combustion engine that generates motive power by using a fuel such as gasoline. The engine 11 outputs the motive power to drive the drive wheel 33. Note that the motive power outputted from the engine 11 is also used by the first motor generator 21 to generate electric power. The engine 11 may have a crankshaft, or an output shaft, coupled to the carrier 31b of the planetary gear mechanism 31.

The first motor generator 21 may be, for example, a three-phase alternating current motor, and may be coupled to the battery 25 via the first inverter 22. Note that the first inverter 22 may be mounted in a power control unit P1 that includes various devices converting electric power, including a DC-to-DC converter. The first motor generator 21 generates electric power by using the motive power outputted from the engine 11. The electric power generated by the first motor generator 21 may be supplied to the battery 25 via the first inverter 22. The battery 25 may be charged thereby. Note that the first motor generator 21 may also be driven with the electric power of the battery 25 and output motive power. The first motor generator 21 may have an output shaft coupled to the sun gear 31a of the planetary gear mechanism 31.

The second motor generator 23 may be, for example, a three-phase alternating current motor, and may be coupled to the battery 25 via the second inverter 24. Note that the second inverter 24 may be mounted in a power control unit P2 that includes various devices converting electric power, including a DC-to-DC converter. The second motor generator 23 may be driven with the electric power of the battery 25 and output motive power used to drive the drive wheel 33. Note that the second motor generator 23 may perform electric power regeneration by using kinetic energy of the drive wheel 33 while the vehicle 1 is decelerating. The electric power generated by the second motor generator 23 may be supplied to the battery 25 via the second inverter 24. The battery 25 may be charged thereby. The second motor generator 23 may have an output shaft coupled to the ring gear 31c of the planetary gear mechanism 31.

The engine 11, the first motor generator 21, and the second motor generator 23 are coupled to each other via the planetary gear mechanism 31, as described above. The planetary gear mechanism 31 may be a power split mechanism that divides the motive power outputted from the engine 11 and transmits the divided motive power to the first motor generator 21 and the second motor generator 23. In the planetary gear mechanism 31, the ring gear 31c may be disposed coaxially on an outer circumferential side with respect to the sun gear 31a. The carrier 31b may support a plurality of pinion gears in a manner to allow rotation and revolution thereof. The pinion gears may each be in mesh with the sun gear 31a and the ring gear 31c.

Figure 2:
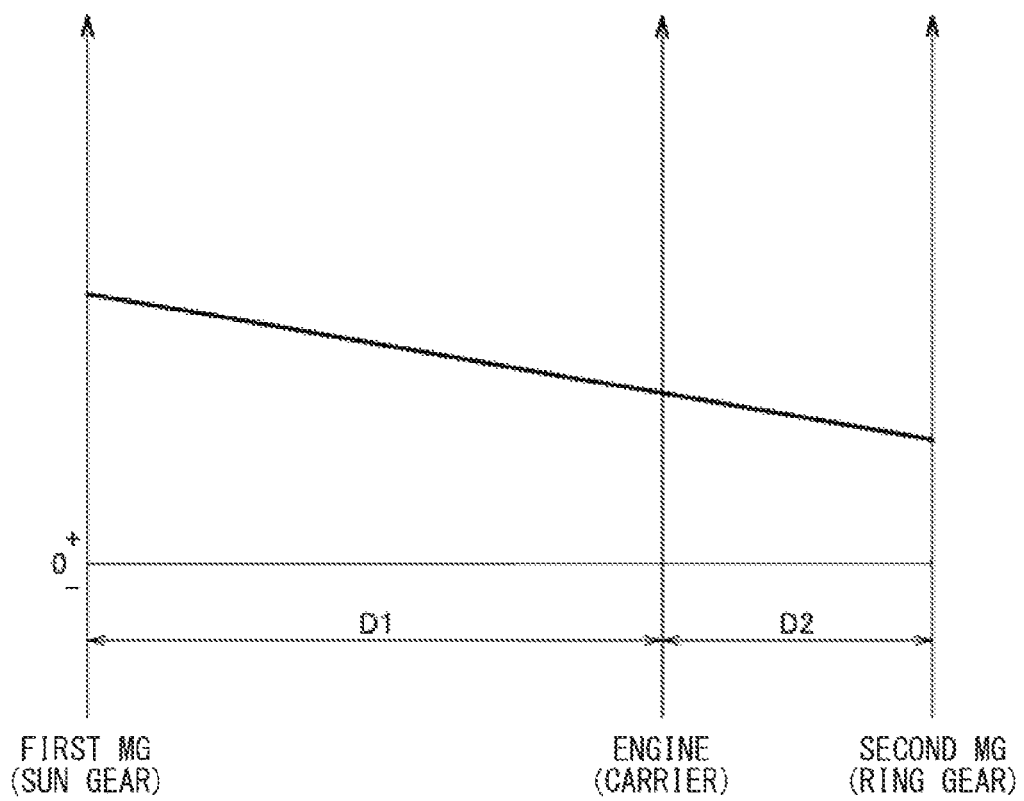
FIG. 2 is a collinear chart illustrating a relationship between respective rotational speeds of an engine, a first motor generator, and a second motor generator in one example embodiment of the technology.

FIG. 2 is a collinear chart illustrating a relationship between respective rotational speeds of the engine 11, the first motor generator 21, and the second motor generator 23. Referring to FIG. 2, a vertical axis representing the rotational speed of the first motor generator 21 (i.e., the rotational speed of the sun gear 31a), a vertical axis representing the rotational speed of the engine 11 (i.e., the rotational speed of the carrier 31b), and a vertical axis representing the rotational speed of the second motor generator 23 (i.e., the rotational speed of the ring gear 31c) are arranged in this order in a collinear chart. In this case, the rotational speed of the engine 11, the rotational speed of the first motor generator 21, and the rotational speed of the second motor generator 23 are in a collinearly aligned relationship with each other. The vertical axis representing the rotational speed of the first motor generator 21 and the vertical axis representing the rotational speed of the engine 11 are at a distance D1 from each other. The vertical axis representing the rotational speed of the engine 11 and the vertical axis representing the rotational speed of the second motor generator 23 are at a distance D2 from each other. A ratio between the distance D1 and the distance D2 is equal to a ratio between the number of teeth of the ring gear 31c and the number of teeth of the sun gear 31a.

As described above, the respective rotational speeds of the engine 11, the first motor generator 21, and the second motor generator 23 have a collinearly aligned relationship with each other in a collinear chart. Further, the respective rotational speeds of the engine 11, the first motor generator 21, and the second motor generator 23 also have such a relationship that if the rotational speeds of any two of the engine 11, the first motor generator 21, and the second motor generator 23 are determined, the rotational speed of the remaining one is unambiguously determined. In the present example embodiment, diagnosis may be performed on the engine 11, the first motor generator 21, and the second motor generator 23 by utilizing such relationships between the respective rotational speeds thereof. A process of the diagnosis will be described later in detail.

As illustrated in FIG. 1, the second motor generator 23 is coupled to the drive wheel 33. For example, the output shaft of the second motor generator 23 may be coupled to the drive wheel 33 via the group of gears 32. The group of gears 32 may include a plurality of gears. The motive power outputted from each of the engine 11 and the second motor generator 23 may be transmitted to the drive wheel 33 via the group of gears 32. Note that the drive wheel 33 may be a front wheel or a rear wheel. Alternatively, the drive wheel 33 may be both of the front wheel and the rear wheel. In other words, the motive power outputted from an output side of the group of gears 32 may be transmitted to both of the front wheel and the rear wheel.

As described above, the vehicle 1 may be a hybrid vehicle with the engine 11 and the second motor generator 23 as drive sources. The vehicle 1 may therefore be switchable between a hybrid-electric-vehicle (HEV) mode, an electric-vehicle (EV) mode, and an engine traveling mode. In the HEV mode, the vehicle 1 travels using motive power outputted from both of the engine 11 and the second motor generator 23. In the EV mode, the vehicle 1 travels using only the motive power outputted from the second motor generator 23, with the engine 11 stopped. In the engine traveling mode, the vehicle 1 travels using only the motive power outputted from the engine 11.

The display 41 may display visual information. Examples of the display 41 include a multi-function display (MFD). The MFD may display various pieces of information, including fuel consumption and travelable distance of the vehicle 1. The driver may perform an input operation using, for example, objects displayed on the display 41. Note that an input device to receive the driver's input operations may be provided in the vehicle 1 separately from the display 41.

The vehicle speed sensor 51 may detect a vehicle speed, that is, the speed of the vehicle 1, and output the detected vehicle speed to the control apparatus 60.

The engine rotational speed sensor 52 may detect the rotational speed of the engine 11, and output the detected rotational speed to the control apparatus 60.

The gradient sensor 53 may detect a gradient of a road on which the vehicle 1 is traveling, and output the detected gradient to the control apparatus 60. Examples of the gradient sensor 53 include an acceleration sensor.

The first temperature sensor 54 may detect a temperature of the power control unit P1, and output the detected temperature to the control apparatus 60.

The second temperature sensor 55 may detect a temperature of the power control unit P2, and output the detected temperature to the control apparatus 60.

The control apparatus 60 may have devices including a central processing unit (CPU) as an arithmetic processing unit, a read only memory (ROM), and a random-access memory (RAM). The ROM may be a memory element that stores a program, a calculation parameter, etc., that are to be used by the CPU. The RAM may be a memory element that temporarily holds, for example, a parameter that changes as appropriate for execution by the CPU.

Figure 3:
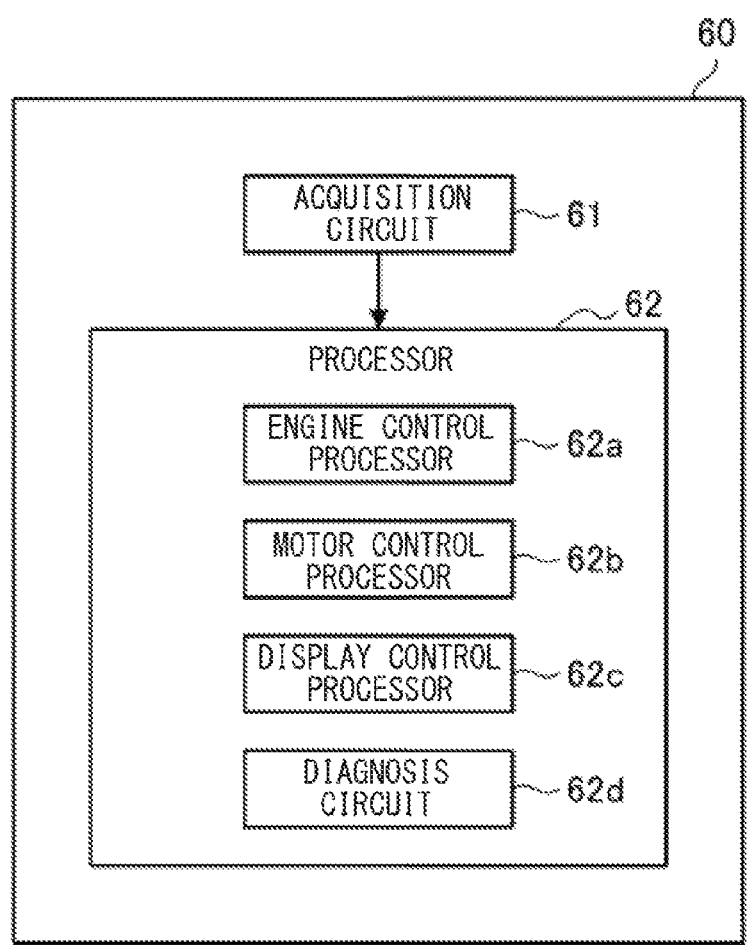
FIG. 3 is a block diagram illustrating an example of a configuration of a control apparatus according to one example embodiment of the technology.

FIG. 3 is a block diagram illustrating an example of a configuration of the control apparatus 60. Referring to FIG. 3, the control apparatus 60 includes a processor 62, for example. The control apparatus 60 may also include an acquisition circuit 61.

The acquisition circuit 61 may acquire various pieces of data to be used in a process to be performed by the processor 62. The acquisition circuit 61 may output the acquired pieces of data to the processor 62. For example, the acquisition circuit 61 may acquire the pieces of data from the vehicle speed sensor 51, the engine rotational speed sensor 52, the gradient sensor 53, the first temperature sensor 54, and the second temperature sensor 55. Further, for example, the acquisition circuit 61 may acquire, from the display 41, data indicating input operations performed by the driver using the display 41.

The processor 62 may control an operation of each device in the vehicle 1. For example, the processor 62 may include an engine control processor 62a, a motor control processor 62b, a display control processor 62c, and a diagnosis circuit 62d.

The engine control processor 62a may control an operation of the engine 11. For example, the engine control processor 62a may control an operation of each device in the engine 11 to control a throttle position, ignition timing, a fuel injection quantity, etc. The engine control processor 62a may thereby control an output of the engine 11.

The motor control processor 62b may control an operation of each of the first motor generator 21 and the second motor generator 23. For example, the motor control processor 62b may control an operation of a switching device of the first inverter 22 to control a supply of electric power performed between the first motor generator 21 and the battery 25. The motor control processor 62b may thereby control the motive power generation and the electric power generation performed by the first motor generator 21. Further, the motor control processor 62b may control an operation of a switching device of the second inverter 24 to control a supply of electric power performed between the second motor generator 23 and the battery 25. The motor control processor 62b may thereby control the motive power generation and the electric power generation performed by the second motor generator 23.

The display control processor 62c may control an operation of the display 41. For example, the display control processor 62c may cause the display 41 to display various pieces of information or to stop displaying. The display control processor 62c may thereby provide the driver with the various pieces of information.

The diagnosis circuit 62d may diagnose a state of equipment mounted on the vehicle 1. In one embodiment, the diagnosis circuit 62d diagnoses a state of at least one of the engine 11, the first motor generator 21, or the second motor generator 23 on the basis of a relationship between the respective rotational speeds of the engine 11, the first motor generator 21, and the second motor generator 23.

Here, the processor 62 may execute a selected traveling mode of the vehicle 1 by switching between a normal mode and a cruise control mode. The normal mode is a traveling mode in which acceleration and deceleration rates of the vehicle 1 are controlled on the basis of acceleration and deceleration operations, that is, an accelerator operation and a braking operation, performed by the driver. The cruise control mode is a traveling mode in which the vehicle speed is maintained at a target vehicle speed irrespective of the acceleration or deceleration operation by the driver. The processor 62 may execute one of the traveling modes selected by an input operation performed by the driver using the display 41, for example.

The control apparatus 60 may communicate with each device in the vehicle 1, as described above. The communication to be performed between the control apparatus 60 and each device may be a controller area network (CAN) communication, for example.

Note that a plurality of block components of the control apparatus 60 according to an example embodiment may be divided by a plurality of control apparatuses to be executed by the plurality of control apparatuses. Alternatively, the plurality of block components may be executed by a single control apparatus. In some embodiments where the plurality of block components of the control apparatus 60 is divided by the plurality of control apparatuses to be executed by the plurality of control apparatuses, the plurality of apparatuses may be coupled to each other via a communication bus such as the CAN.

According to one embodiment, as described above, the processor 62 of the control apparatus 60 diagnoses a state of at least one of the engine 11, the first motor generator 21, or the second motor generator 23 on the basis of a relationship between the respective rotational speeds of the engine 11, the first motor generator 21, and the second motor generator 23. This makes it possible to appropriately diagnose the state of the equipment mounted on the vehicle 1. A process related to such a diagnosis to be performed by the processor 62 will be described later in greater detail.

With reference to FIGS. 4 to 10, a description will be given of an operation of the control apparatus 60 according to an example embodiment of the technology.

Figure 4:
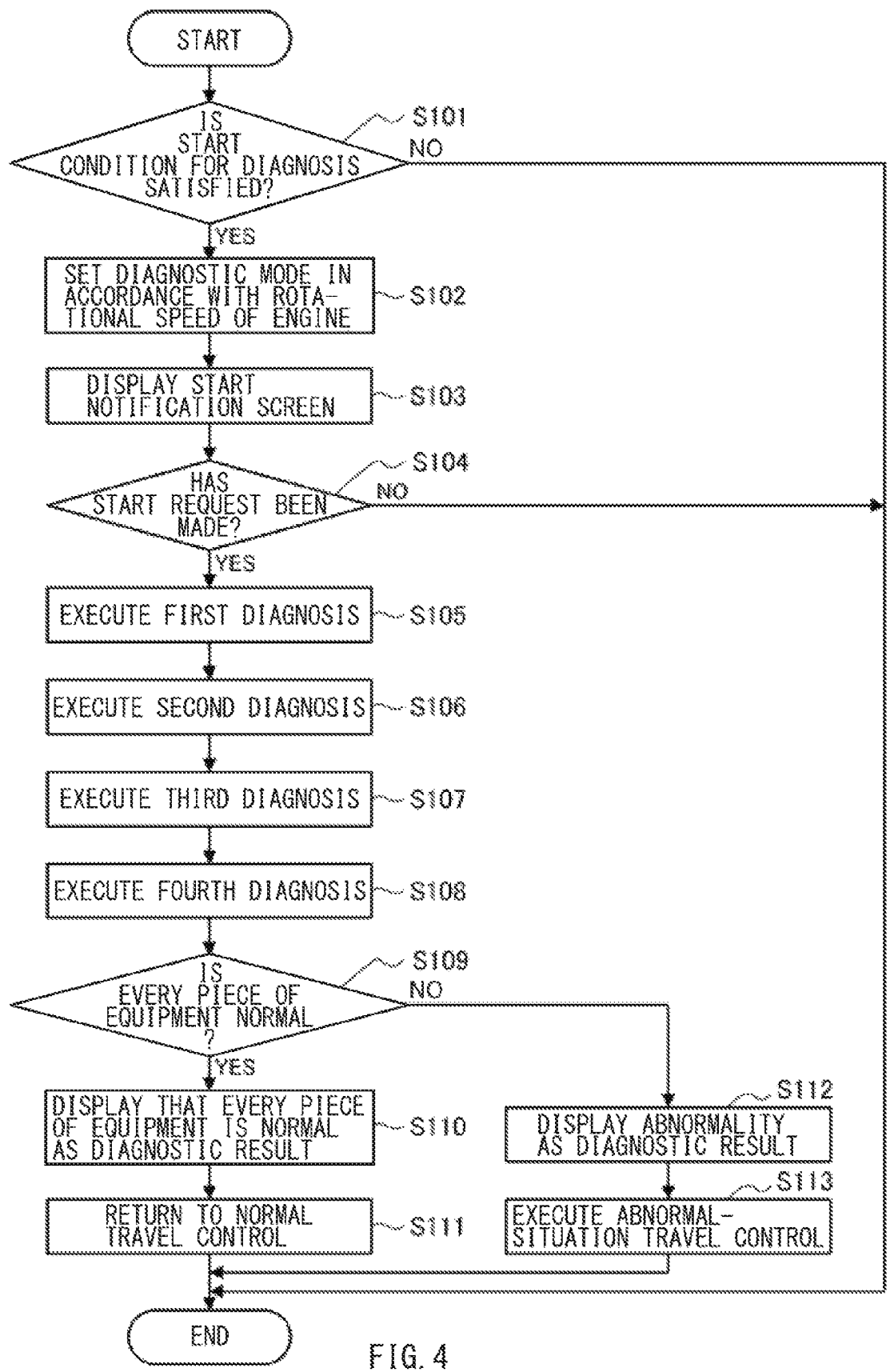
FIG. 4 is a flowchart illustrating an example of a flow of an overall process related to a diagnosis to be performed by the control apparatus according to one example embodiment of the technology.

FIG. 4 is a flowchart illustrating an example of a flow of an overall process related to the diagnosis to be performed by the control apparatus 60. Note that a control flow illustrated in FIG. 4 may be executed repeatedly at predetermined time intervals, for example.

Upon start of the control flow illustrated in FIG. 4, in step S101, the processor 62 may first determine whether a predetermined start condition for the diagnosis is satisfied. If the processor 62 determines that the start condition is satisfied (step S101: YES), the processor 62 may cause the control flow to proceed to step S102. If the processor 62 determines that the start condition is not satisfied (step S101: NO), the processor 62 may cause the control flow illustrated in FIG. 4 to end.

As will be described later, during the diagnosis (e.g., a first diagnosis, a second diagnosis, and a third diagnosis to be described later) performed by the control apparatus 60, respective outputs of the engine 11, the first motor generator 21, and the second motor generator 23 may be controlled. The start condition for the diagnosis may thus be set from various viewpoints including, without limitation, the viewpoint of reducing a sense of discomfort that the driver may feel, the viewpoint of securing safety, and the viewpoint of causing less inconvenience to other vehicles. For example, the start condition for the diagnosis may include a plurality of conditions, and the processor 62 may determine that the start condition is satisfied if all of the conditions are satisfied.

For example, the start condition may include a condition that the cruise control mode is under execution. During execution of the cruise control mode, no acceleration or deceleration operation is performed by the driver. Performing the diagnosis only while the cruise control mode is under execution helps to prevent the driver from feeling a sense of discomfort due to actual behaviors of the vehicle 1 not corresponding to the driver's acceleration and deceleration operations.

The start condition may further include, for example, a condition that no other vehicle is present around the vehicle 1. In the course of the diagnosis performed by the control apparatus 60, noise can occur due to a change in output of each device. Performing the diagnosis only in the absence of other vehicles around the vehicle 1 helps to prevent inconvenience to other vehicles around the vehicle 1 that would be caused by the noise occurring in a situation where the diagnosis is performed in the presence of other vehicles around the vehicle 1. Furthermore, this allows safety of the vehicle 1 to be secured. Note that the control apparatus 60 may determine the presence or absence of any other vehicle around the vehicle 1 by using, for example, vehicle-to-vehicle communication, or cameras or sensors such as radars that detect surrounding environments, including the front, the rear, the right side, and the left side, of the vehicle 1.

The start condition may further include, for example, a condition that the vehicle speed is higher than or equal to a lower limit value (e.g., 20 km/h) and lower than an upper limit value (e.g., 100 km/h). Performing the diagnosis only in the case where the vehicle speed is higher than or equal to the lower limit value allows the diagnosis to be performed under a high background-noise situation. This helps to prevent the noise occurring in the course of the diagnosis from causing any inconvenience to other vehicles, and also helps to prevent an occupant of the vehicle 1 from having a feeling of anxiety. Here, during execution of the diagnosis, the output of each device may be controlled for diagnosis purposes. This can result in a shortage of drive force relative to required drive force upon application of high load. Performing the diagnosis only in the case where the vehicle speed is lower than the upper limit value therefore helps to prevent the diagnosis from being performed upon application of high load, thus helping to prevent a shortage of the drive force relative to the required drive force.

The start condition may further include, for example, a condition that the rotational speed of the engine 11 is higher than or equal to a lower limit value (e.g., 1,200 rpm) and lower than an upper limit value (e.g., 4,200 rpm). Performing the diagnosis only in the case where the rotational speed of the engine 11 is higher than or equal to the lower limit value allows the diagnosis to be performed under a high background-noise situation. This helps to prevent the noise occurring in the course of the diagnosis from causing any inconvenience to other vehicles, and also helps to prevent an occupant of the vehicle 1 from having a feeling of anxiety. Further, performing the diagnosis only in the case where the rotational speed of the engine 11 is lower than the upper limit value helps to prevent the diagnosis from being performed upon application of high load, thus helping to prevent a shortage of the drive force relative to the required drive force.

The start condition may further include, for example, a condition that the vehicle 1 is traveling on an uphill road and that a gradient of the road on which the vehicle 1 is traveling is higher than or equal to a lower limit value (e.g., 5%) and lower than an upper limit value (e.g., 20%). Here, if the road on which the vehicle 1 is traveling is a downhill road, the rotational speed of the engine 11 tends to change greatly in response to a change in output of the engine 11. Such a change in the rotational speed can be a factor giving the driver a sense of discomfort. Performing the diagnosis only in the case where the gradient of the road on which the vehicle 1 is traveling is higher than or equal to the lower limit value helps to prevent the rotational speed of the engine 11 from changing greatly, thus helping to prevent the driver from feeling a sense of discomfort. Further, performing the diagnosis only in the case where the gradient of the road on which the vehicle 1 is traveling is lower than the upper limit value helps to prevent the diagnosis from being performed upon application of high load, thus helping to prevent a shortage of the drive force relative to the required drive force.

The start condition may further include, for example, a condition that a target value of an output of a drive source (i.e., each of the engine 11 and the second motor generator 23) calculated by the control apparatus 60 is greater than or equal to a lower limit value (e.g., 20 kW) and less than an upper limit value (e.g., 80 kW). Performing the diagnosis only in the case where the target value of the output of the drive source is greater than or equal to the lower limit value allows the diagnosis to be performed under a high background-noise situation. This helps to prevent the noise occurring in the course of the diagnosis from causing any inconvenience to other vehicles, and also helps to prevent an occupant of the vehicle 1 from having a feeling of anxiety. Further, performing the diagnosis only in the case where the target value of the output of the drive source is less than the upper limit value helps to prevent the diagnosis from being performed upon application of high load, thus helping to prevent a shortage of the drive force relative to the required drive force.

The start condition may further include, for example, a condition that a state where the affirmative determination has been made as to satisfaction of the other conditions has lasted for a predetermined period of time (e.g., five seconds). This helps to prevent a situation where a result of determination as to the start condition keeps changing fast.

The start condition may further include, for example, a condition that a predetermined period of time (e.g., 200 hours) has elapsed since the completion of the last diagnosis. This helps to prevent the diagnosis from being performed repeatedly with high frequency, and thus improves fuel efficiency.

The start condition may further include, for example, a condition that the vehicle 1 has traveled over a predetermined distance (e.g., 1,000 km) since the completion of the last diagnosis. This helps to prevent the diagnosis from being performed again under a situation where the state of the equipment in the vehicle 1 has not changed greatly since the last diagnosis.

While examples of the start condition for the diagnosis are described above, the foregoing examples are not limitative. For example, some of the above-described conditions may be omitted from conditions to be included in the start condition. Further, for example, conditions other than those described above may be additionally included in the start condition.

If the processor 62 makes the YES determination in step S101, the processor 62 may set a diagnostic mode in accordance with the rotational speed of the engine 11.

As will be described later, the control apparatus 60 may perform the diagnosis while controlling the rotational speed of the engine 11 to be equal to a reference rotational speed corresponding to a relevant diagnostic mode. Examples of the diagnostic mode may include a low-rotation diagnostic mode and a high-rotation diagnostic mode. In a case where the rotational speed of the engine 11 is lower than a predetermined rotational speed (e.g., 3,000 rpm), the processor 62 may set the diagnostic mode to the low-rotation diagnostic mode. In a case where the rotational speed of the engine 11 is higher than or equal to the predetermined rotational speed, the processor 62 may set the diagnostic mode to the high-rotation diagnostic mode.

In the low-rotation diagnostic mode, the diagnosis may be performed with the rotational speed of the engine 11 controlled to be equal to a reference rotational speed (e.g., 1,500 rpm) lower than that in the high-rotation diagnostic mode. This allows for diagnosing of states of various pieces of equipment in a situation where the rotational speed of the engine 11 is low. In the high-rotation diagnostic mode, the diagnosis may be performed with the rotational speed of the engine 11 controlled to be equal to a reference rotational speed (e.g., 4,000 rpm) higher than that in the high-rotation diagnostic mode. This allows for diagnosing of states of various pieces of equipment in a situation where the rotational speed of the engine 11 is high.

Thereafter, in step S103, the processor 62 may cause the display 41 to display a start notification screen.

The start notification screen may be provided to receive a start request (i.e., a request for a start of the diagnosis) from the driver. For example, a button to receive the start request may be displayed on the start notification screen. In this case, an operation of touching the button on the start notification screen performed by the driver may serve as an operation of entering the start request.

Thereafter, in step S104, the processor 62 may determine whether a start request has been made by the driver. If the processor 62 determines that a start request has been made (step S104: YES), the processor 62 may cause the control flow to proceed to step S105. If the processor 62 determines that no start request has been made (step S104: NO), the processor 62 may cause the control flow illustrated in FIG. 4 to end.

If the processor 62 makes the YES determination in step S104, the processor 62 may execute various kinds of diagnoses. For example, if the processor 62 makes the YES determination in step S104, the processor 62 may execute a first diagnosis in step S105. Thereafter, in step S106, the processor 62 may execute a second diagnosis. Thereafter, in step S107, the processor 62 may execute a third diagnosis. Thereafter, in step S108, the processor 62 may execute a fourth diagnosis. Note that processes in the first to fourth diagnoses will be described later in detail.

In the control flow illustrated in FIG. 4, the start request made by the driver may trigger the start of the diagnosis; however, triggers for the start of the diagnosis are not limited to this example. For example, after displaying of the start notification screen in step S103, the processor 62 may start the diagnosis upon a lapse of a predetermined period of time (e.g., 10 seconds) with no start request being made by the driver.

Thereafter, in step S109, the processor 62 may determine whether every piece of equipment is normal on the basis of results of the diagnoses.

If the processor 62 determines in step S109 that every piece of equipment is normal (step S109: YES), the processor 62 may cause the control flow to proceed to step S110, and cause the display 41 to display that every piece of equipment is normal, as a diagnostic result.

Thereafter, in step S111, the processor 62 may cause travel control to return to normal travel control, and cause the control flow illustrated in FIG. 4 to end. The normal travel control may be a type of travel control under which the vehicle 1 had been traveling before the diagnosis (including the first to fourth diagnoses) of the vehicle 1 was performed.

If the processor 62 determines in step S109 that at least one piece of equipment is abnormal (step S109: NO), the processor 62 may cause the control flow to proceed to step S112, and cause the display 41 to display an abnormality as a diagnostic result.

Thereafter, in step S113, the processor 62 may execute abnormal-situation travel control, and cause the control flow illustrated in FIG. 4 to end. The abnormal-situation travel control may cause the engine 11 to be driven at a rotational speed other than that at which the abnormality of the equipment occurs. For example, if the determination that at least one piece of equipment is abnormal is made in the low-rotation diagnostic mode, the processor 62 may, in executing the abnormal-situation travel control, set a lowest rotational speed of the engine 11 to a value (e.g., 2,000 rpm) higher than a lowest rotational speed under the normal travel control.

An example of the flow of the overall process related to the diagnosis to be performed by the control apparatus 60 has been described above with reference to the control flow illustrated in FIG. 4; however, the process to be performed by the processor 62 is not limited to the above-described example.

For example, the processor 62 may perform a diagnosis in the high-rotation diagnostic mode in preference to that in the low-rotation diagnostic mode if the last diagnosis was performed in the low-rotation diagnostic mode. For example, if the last diagnosis was performed in the low-rotation diagnostic mode, the processor 62 may, in step S102, set the diagnostic mode to the high-rotation diagnostic mode irrespective of the rotational speed of the engine 11. Note that if the last diagnosis was performed in the high-rotation diagnostic mode, the processor 62 may perform a diagnosis in the low-rotation diagnostic mode in preference to that in the high-rotation diagnostic mode, similarly to the above.

Further, the processor 62 may perform a process of causing the display 41 to display various pieces of information, in addition to the foregoing example. For example, in step S101, the processor 62 may cause the display 41 to display a determination status (e.g., indication as to which condition is currently under determination).

Further, the processor 62 may discontinue the diagnosis before completion if an end condition is satisfied in the course of the diagnosis. The end condition may be, for example, that an end request (i.e., a request for ending the diagnosis) has been made by the driver. The end condition may also be, for example, that a braking operation has been performed by the driver. In a case where the processor 62 discontinues the diagnosis, the processor 62 may cause the display 41 to display that the diagnosis is discontinued. Thereafter, the processor 62 may cause the travel control to return to the normal travel control, and cause the control flow illustrated in FIG. 4 to end.

In the following, processes in the first diagnosis, the second diagnosis, the third diagnosis, and the fourth diagnosis will be described in detail with reference to FIGS. 5 to 10.

Figure 5:
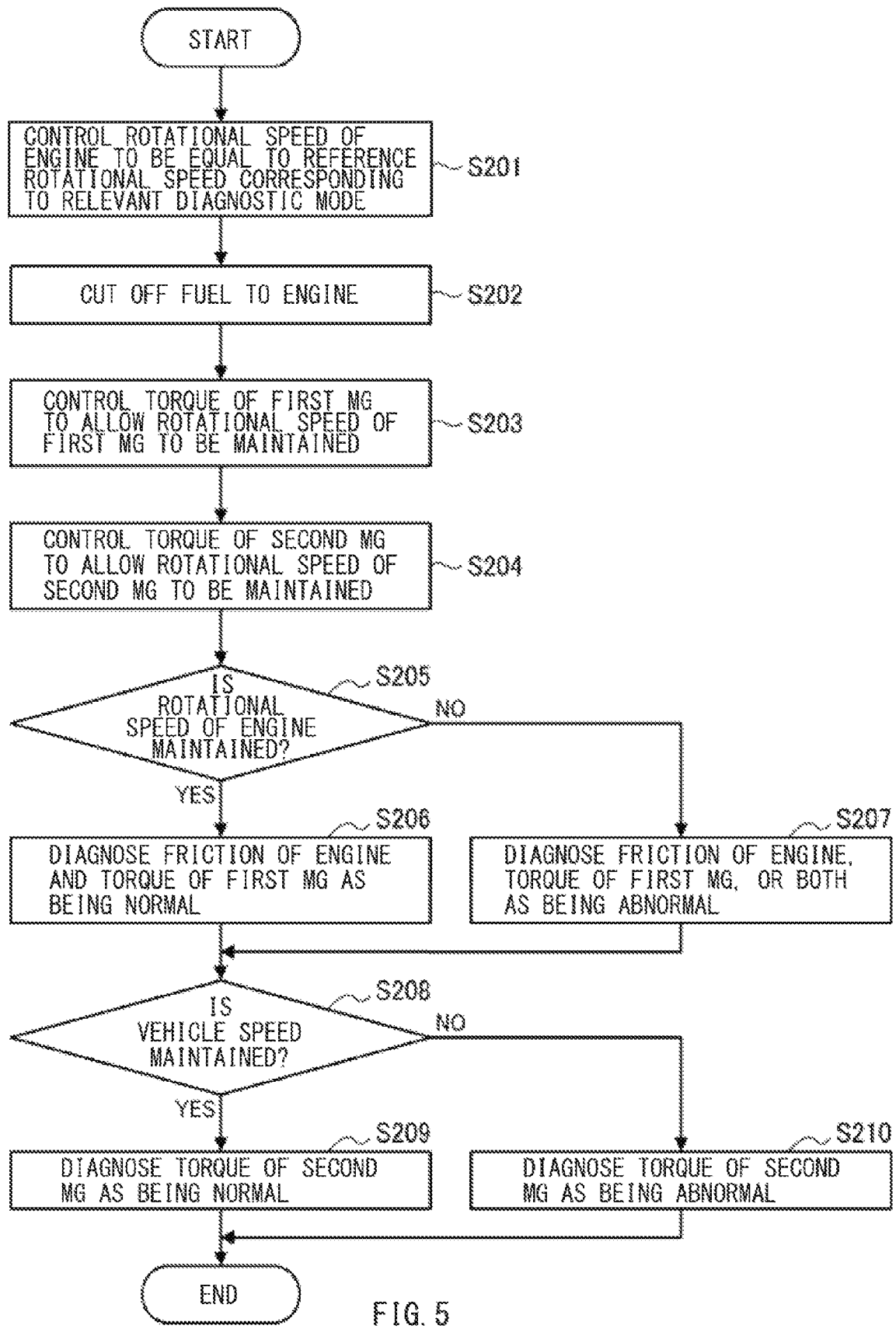
FIG. 5 is a flowchart illustrating an example of a flow of a process in a first diagnosis to be performed by the control apparatus according to one example embodiment of the technology.

FIG. 5 is a flowchart illustrating an example of a flow of a process in the first diagnosis to be performed by the control apparatus 60. A control flow illustrated in FIG. 5 corresponds to that in a process of step S105 in the flowchart of FIG. 4.

Figure 6:
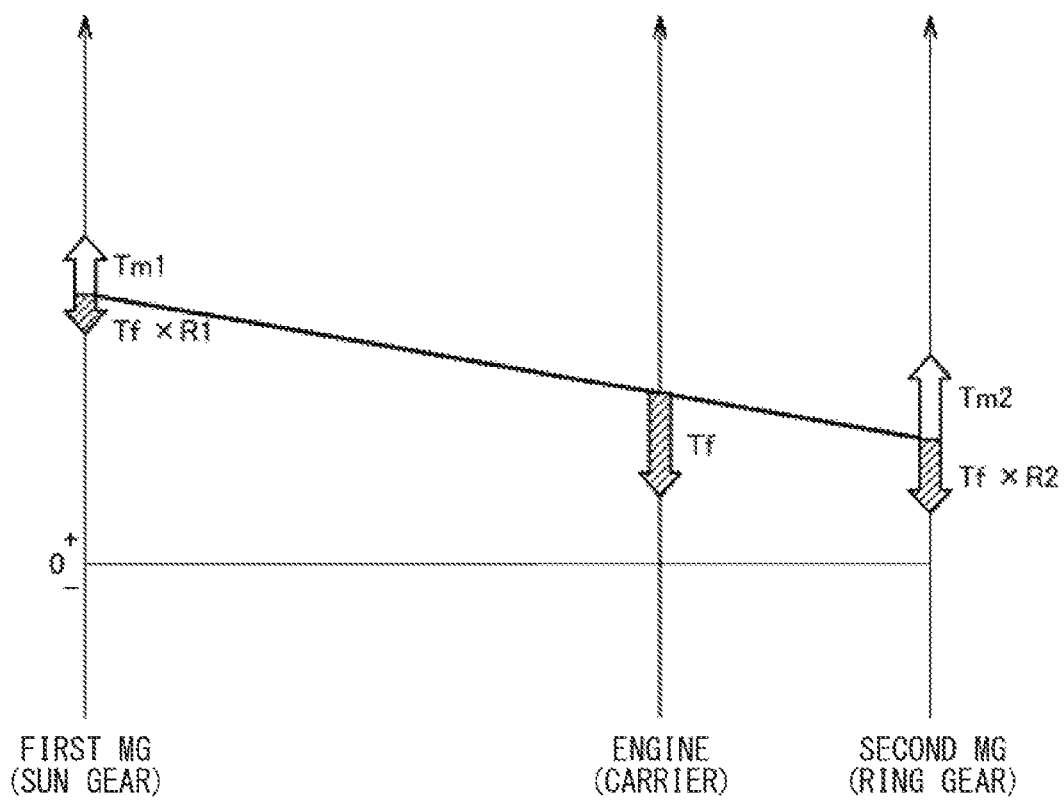
FIG. 6 is a collinear chart illustrating an example of the respective rotational speeds of the engine, the first motor generator, and the second motor generator, and torques acting on the engine, the first motor generator, and the second motor generator during execution of the first diagnosis by the control apparatus according to one example embodiment of the technology.

FIG. 6 is a collinear chart illustrating an example of the respective rotational speeds of the engine 11, the first motor generator 21, and the second motor generator 23, and torques acting on the engine 11, the first motor generator 21, and the second motor generator 23 during execution of first diagnosis. Note that in FIG. 6, each torque is represented by a hatched arrow or a hollow arrow. The direction of the arrow representing a torque indicates the direction of the torque. Note that a positive direction of the torque coincides with a positive direction of the rotational speed, and a negative direction of the torque coincides with a negative direction of the rotational speed. The arrow on the vertical axis representing the rotational speed of the engine 11 represents a torque acting on the engine 11. The arrows on the vertical axis representing the rotational speed of the first motor generator 21 represent torques acting on the first motor generator 21. The arrows on the vertical axis representing the rotational speed of the second motor generator 23 represent torques acting on the second motor generator 23.

In the first diagnosis, the processor 62 may execute a rotational-speed maintenance control in which operations of the engine 11, the first motor generator 21, and the second motor generator 23 are controlled to allow the respective rotational speeds of the engine 11, the first motor generator 21, and the second motor generator 23 to be maintained. Note that a process corresponding to the rotational-speed maintenance control in the first diagnosis may be in steps S202, S203, and S204 in FIG. 5. During execution of the rotational-speed maintenance control, the processor 62 may diagnose a state of each of the engine 11, the first motor generator 21, and the second motor generator 23 on the basis of a relationship between the respective rotational speeds of the engine 11, the first motor generator 21, and the second motor generator 23.

Upon start of the control flow illustrated in FIG. 5, in step S201, the processor 62 may first control the rotational speed of the engine 11 to be equal to a reference rotational speed corresponding to the relevant diagnostic mode. As described above, the reference rotational speed in the low-rotation diagnostic mode may be 1,500 rpm, for example. The reference rotational speed in the high-rotation diagnostic mode may be 4,000 rpm, for example.

Thereafter, in step S202, the processor 62 may cut off fuel to the engine 11. The cutting off of fuel to the engine 11 is a process of stopping a fuel supply to the engine 11, and may be executed, for example, by causing a fuel injection valve of the engine 11 to stop injecting fuel.

In a case where fuel to the engine 11 is cut off, as illustrated in FIG. 6, for example, a torque Tf caused by friction of the engine 11 acts on the engine 11. The torque Tf caused by the friction acts in the negative direction. Here, the planetary gear mechanism 31 may divide motive power outputted from the engine 11 and transmit the divided motive power to the first motor generator 21 and the second motor generator 23. A proportion R1 in which the motive power outputted from the engine 11 is distributed to the first motor generator 21 is, if represented using the distances D1 and D2 illustrated in FIG. 2, equal to D2/(D1+D2). Further, a proportion R2 in which the motive power outputted from the engine 11 is distributed to the second motor generator 23 is equal to D1/(D1+D2). Therefore, in the case where the torque Tf caused by the friction acts on the engine 11, a torque (Tf×R1) that is R1 times higher than the torque Tf acts on the first motor generator 21 in the negative direction, and a torque (Tf×R2) that is R2 times higher than the torque Tf acts on the second motor generator 23 in the negative direction.

Thereafter, in step S203, the processor 62 may control a torque of the first motor generator 21 to allow the rotational speed of the first motor generator 21 to be maintained.

For example, as illustrated in FIG. 6, the processor 62 may control a torque Tm1 of the first motor generator 21 to cancel out the torque (Tf×R1) acting on the first motor generator 21 in the negative direction. In other words, in this case, the torque Tm1 may be controlled to be in the positive direction and have a magnitude equal to that of the torque (Tf×R1). By thus making a total sum of the torques acting on the first motor generator 21 ideally zero, it is possible to maintain the rotational speed of the first motor generator 21. Note that a value of the torque Tf to be used in determining the torque Tm1 may be a normal value that is set in advance in accordance with, for example, the rotational speed of the engine 11.

Thereafter, in step S204, the processor 62 may control a torque of the second motor generator 23 to allow the rotational speed of the second motor generator 23 to be maintained, that is, to allow the vehicle speed to be maintained.

For example, as illustrated in FIG. 6, the processor 62 may control a torque Tm2 of the second motor generator 23 to cancel out the torque (Tf×R2) acting on the second motor generator 23 in the negative direction, taking into account a torque caused by travel resistance and acting on the second motor generator 23 in the negative direction. In other words, in this case, the torque Tm2 may be controlled to be in the positive direction and have a magnitude equal to a sum of the torque (Tf×R2) and the torque caused by the travel resistance. By thus making a total sum of the torques acting on the second motor generator 23 ideally zero, it is possible to maintain the rotational speed of the second motor generator 23. Note that a value of the torque Tf to be used in determining the torque Tm2 may be a normal value that is set in advance in accordance with, for example, the rotational speed of the engine 11, similarly to a case of determining the torque Tm1.

As described above, in the first diagnosis, the processor 62 may execute the rotational-speed maintenance control that controls an operation of each of the engine 11, the first motor generator 21, and the second motor generator 23 to allow the rotational speed of each of the engine 11, the first motor generator 21, and the second motor generator 23 to be maintained. The rotational-speed maintenance control in the first diagnosis may control the torques of the first motor generator 21 and the second motor generator 23 with fuel to the engine 11 being cut off. In the first diagnosis, it is thus possible to diagnose a state of each piece of equipment in a situation where the engine 11 stops and where the first motor generator 21 and the second motor generator 23 are outputting torques in the positive direction.

Thereafter, in step S205, the processor 62 may determine whether the rotational speed of the engine 11 is maintained. For example, if an amount of change in the rotational speed of the engine 11 is smaller than or equal to a predetermined value (e.g., 100 rpm) when the foregoing rotational-speed maintenance control has been continued for a predetermined period of time (e.g., two seconds), the processor 62 may determine that the rotational speed of the engine 11 is maintained.

If the processor 62 determines in step S205 that the rotational speed of the engine 11 is maintained (step S205: YES), the processor 62 may cause the control flow to proceed to step S206, and diagnose the friction of the engine 11 and the torque of the first motor generator 21 as being normal.

If the processor 62 determines in step S205 that the rotational speed of the engine 11 is not maintained (step S205: NO), the processor 62 may cause the control flow to proceed to step S207, and diagnose the friction of the engine 11, the torque of the first motor generator 21, or both as being abnormal.

Here, the rotational speed of the second motor generator 23 is less changeable than the rotational speed of each of the engine 11 and the first motor generator 21. Therefore, if the rotational speed of the engine 11 is not maintained, it is possible to determine that the rotational speed of the first motor generator 21 has changed. In such a case, there is a possibility that the torque Tf has a value different from a normal value, thus causing the total sum of the torques acting on the first motor generator 21 to be other than zero, resulting in a change in the rotational speed of the first motor generator 21. There is another possibility that, although the torque Tf has a value substantially equal to a normal value, a torque actually being outputted from the first motor generator 21 has a value different from an instruction value, thus causing the total sum of the torques acting on the first motor generator 21 to be other than zero, resulting in a change in the rotational speed of the first motor generator 21. Therefore, in the case where the processor 62 determines that the rotational speed of the engine 11 is not maintained, the processor 62 may diagnose the friction of the engine 11, the torque of the first motor generator21, or both as being abnormal.

After step S206 or step S207, the processor 62 may determine in step S208 whether the vehicle speed is maintained, that is, whether the rotational speed of the second motor generator 23 is maintained. For example, if an amount of change in the vehicle speed is smaller than or equal to a predetermined value (e.g., 3 km/h) when the foregoing rotational-speed maintenance control has been continued for a predetermined period of time (e.g., two seconds), the processor 62 may determine that the vehicle speed is maintained.

If the processor 62 determines in step S208 that the vehicle speed is maintained (step S208: YES), the processor 62 may cause the control flow to proceed to step S209, and diagnose the torque of the second motor generator 23 as being normal.

If the processor 62 determines in step S208 that the vehicle speed is not maintained (step S208: NO), the processor 62 may cause the control flow to proceed to step S210, and diagnose the torque of the second motor generator 23 as being abnormal.

Here, in the case where the processor 62 makes the NO determination in step S208, there is a possibility that a torque actually being outputted from the second motor generator 23 has a value different from an instruction value, thus causing the total sum of the torques acting on the second motor generator 23 to be other than zero, resulting in a change in the vehicle speed. Therefore, in the case where the processor 62 determines that the vehicle speed is not maintained, the processor 62 may diagnose the torque of the second motor generator 23 as being abnormal.

After the process of step S209 or step S210, the processor 62 may cause the control flow illustrated in FIG. 5 to end.

Figure 7:
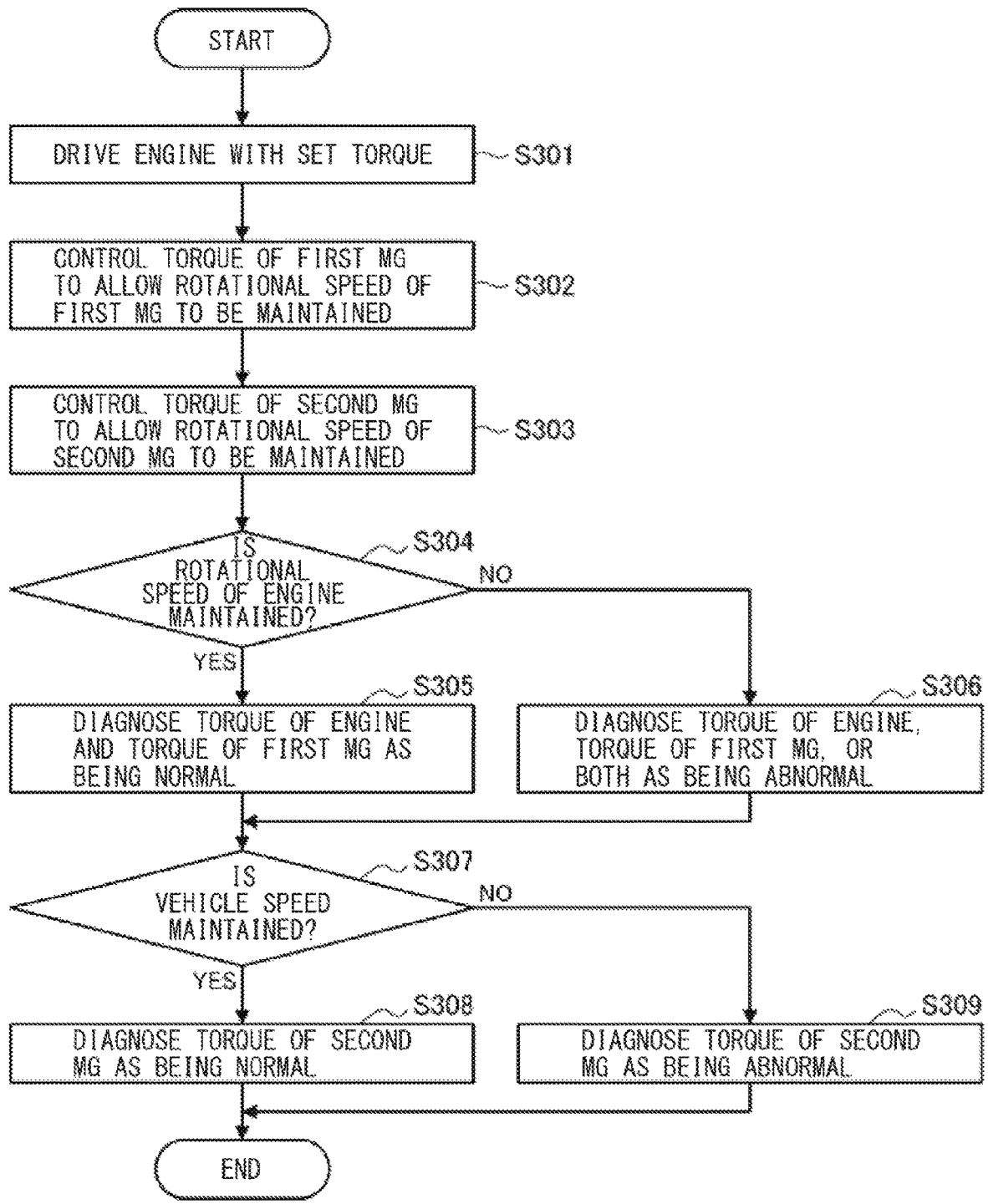
FIG. 7 is a flowchart illustrating an example of a flow of a process in a second diagnosis to be performed by the control apparatus according to one example embodiment of the technology.

FIG. 7 is a flowchart illustrating an example of a flow of a process in the second diagnosis to be performed by the control apparatus 60. A control flow illustrated in FIG. 7 corresponds to that in a process of step S106 in the flowchart of FIG. 4.

Figure 8:
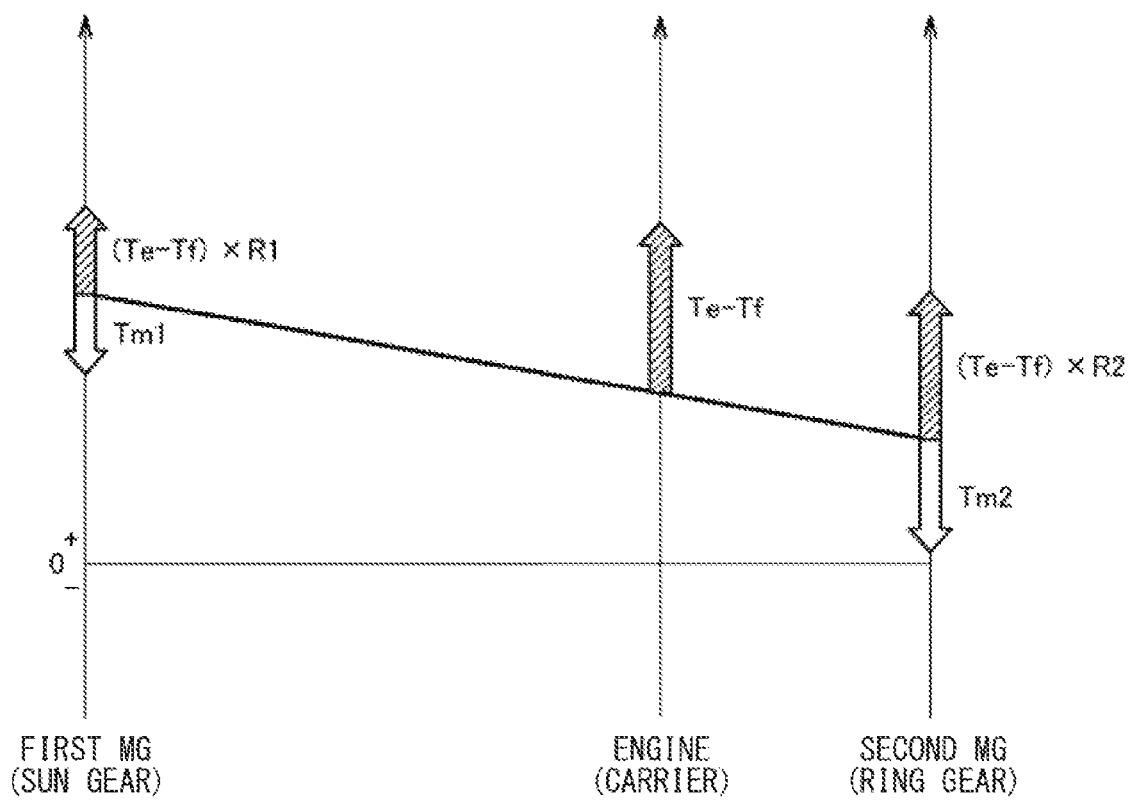
FIG. 8 is a collinear chart illustrating an example of the respective rotational speeds of the engine, the first motor generator, and the second motor generator, and torques acting on the engine, the first motor generator, and the second motor generator during execution of the second diagnosis by the control apparatus according to one example embodiment of the technology.

FIG. 8 is a collinear chart illustrating an example of the respective rotational speeds of the engine 11, the first motor generator 21, and the second motor generator 23, and torques acting on the engine 11, the first motor generator 21, and the second motor generator 23 during execution of the second diagnosis. In FIG. 8, each torque is represented by a hatched arrow or a hollow arrow, as in FIG. 6.

In the second diagnosis, as in the first diagnosis, the processor 62 may execute the rotational-speed maintenance control, and diagnose, during the execution of the rotational-speed maintenance control, the state of each of the engine 11, the first motor generator 21, and the second motor generator 23 on the basis of the relationship between the respective rotational speeds of the engine 11, the first motor generator 21, and the second motor generator 23. Note that a process corresponding to the rotational-speed maintenance control in the second diagnosis may be in steps S301, S302, and S303 in FIG. 7.

Upon start of the control flow illustrated in FIG. 7, in step S301, the processor 62 may first drive the engine 11 with a set torque (e.g., 30 Nm). The set torque may be higher than at least the torque Rf caused by friction of the engine 11.

For example, if the engine 11 is driven with a set torque Te, a torque (Te−Tf) equal to the set torque Te minus the torque Tf caused by friction of the engine 11 acts on the engine 11, as illustrated in FIG. 8. The torque (Te−Tf) acts in the positive direction. Therefore, a torque ((Te−Tf)×R1) that is R1 times higher than the torque (Te−Tf) acts on the first motor generator 21 in the positive direction, and a torque ((Te−Tf)×R2) that is R2 times higher than the torque (Te−Tf) acts on the second motor generator 23 in the positive direction.

Thereafter, in step S302, the processor 62 may control the torque of the first motor generator 21 to allow the rotational speed of the first motor generator 21 to be maintained.

For example, as illustrated in FIG. 8, the processor 62 may control the torque Tm1 of the first motor generator 21 to cancel out the torque ((Te−Tf)×R1) acting on the first motor generator 21 in the positive direction. In other words, in this case, the torque Tm1 may be controlled to be in the negative direction and have a magnitude equal to that of the torque ((Te−Tf)×R1). By thus making the total sum of the torques acting on the first motor generator 21 ideally zero, it is possible to maintain the rotational speed of the first motor generator 21. Note that the value of the torque Tf to be used in determining the torque Tm1 may be a normal value that is set in advance in accordance with, for example, the rotational speed of the engine 11.

Thereafter, in step S303, the processor 62 may control the torque of the second motor generator 23 to allow the rotational speed of the second motor generator 23 to be maintained, that is, to allow the vehicle speed to be maintained.

For example, as illustrated in FIG. 8, the processor 62 may control the torque Tm2 of the second motor generator 23 to cancel out the torque ((Te−Tf)×R2) acting on the second motor generator 23 in the positive direction, taking into account a torque caused by travel resistance and acting on the second motor generator 23 in the negative direction. In other words, in this case, the torque Tm2 may be controlled to be in the negative direction and have a magnitude equal to a magnitude of the torque ((Te−Tf)×R2) minus a magnitude of the torque caused by the travel resistance. By thus making the total sum of the torques acting on the second motor generator 23 ideally zero, it is possible to maintain the rotational speed of the second motor generator 23. Note that the value of the torque Tf to be used in determining the torque Tm2 may be a normal value that is set in advance in accordance with, for example, the rotational speed of the engine 11, similarly to the case of determining the torque Tm1.

As described above, in the second diagnosis, the processor 62 may execute the rotational-speed maintenance control that controls the operation of each of the engine 11, the first motor generator 21, and the second motor generator 23 to allow the rotational speed of each of the engine 11, the first motor generator 21, and the second motor generator 23 to be maintained. Here, the rotational-speed maintenance control in the second diagnosis may control the torques of the first motor generator 21 and the second motor generator 23 with the engine 11 being driven, unlike the rotational-speed maintenance control in the first diagnosis. In the second diagnosis, it is thus possible to diagnose the state of each piece of equipment in a situation where the engine 11 is driven and where the first motor generator 21 and the second motor generator 23 are outputting torques in the negative direction.

Thereafter, in step S304, the processor 62 may determine whether the rotational speed of the engine 11 is maintained. Note that in step S304, a process similar to that of step S205 in FIG. 5 described above may be performed.

If the processor 62 determines in step S304 that the rotational speed of the engine 11 is maintained (step S304: YES), the processor 62 may cause the control flow to proceed to step S305, and diagnose the torque of the engine 11 and the torque of the first motor generator 21 as being normal.

If the processor 62 determines in step S304 that the rotational speed of the engine 11 is not maintained (step S304: NO), the processor 62 may cause the control flow to proceed to step S306, and diagnose the torque of the engine 11, the torque of the first motor generator 21, or both as being abnormal. Here, in the case where the processor 62 makes the NO determination in step S304 in the second diagnosis, there is a possibility that a torque actually being outputted from the engine 11 has a value different from an instruction value, or a possibility that a torque actually being outputted from the first motor generator 21 has a value different from an instruction value.

After step S305 or step S306, the processor 62 may determine in step S307 whether the vehicle speed is maintained, that is, whether the rotational speed of the second motor generator 23 is maintained. Note that in step S307, a process similar to that of step S208 in FIG. 5 described above may be performed.

If the processor 62 determines in step S307 that the vehicle speed is maintained (step S307: YES), the processor 62 may cause the control flow to proceed to step S308, and diagnose the torque of the second motor generator 23 as being normal.

If the processor 62 determines in step S307 that the vehicle speed is not maintained (step S307: NO), the processor 62 may cause the control flow to proceed to step S309, and diagnose the torque of the second motor generator 23 as being abnormal. Here, in the case where the processor 62 makes the NO determination in step S307 of the second diagnosis, there is a possibility that a torque actually being outputted from the second motor generator 23 has a value different from an instruction value, as in the case where the processor 62 makes the NO determination in step S208 of the first diagnosis.

After the process of step S308 or step S309, the processor 62 may cause the control flow illustrated in FIG. 7 to end.

Figure 9:
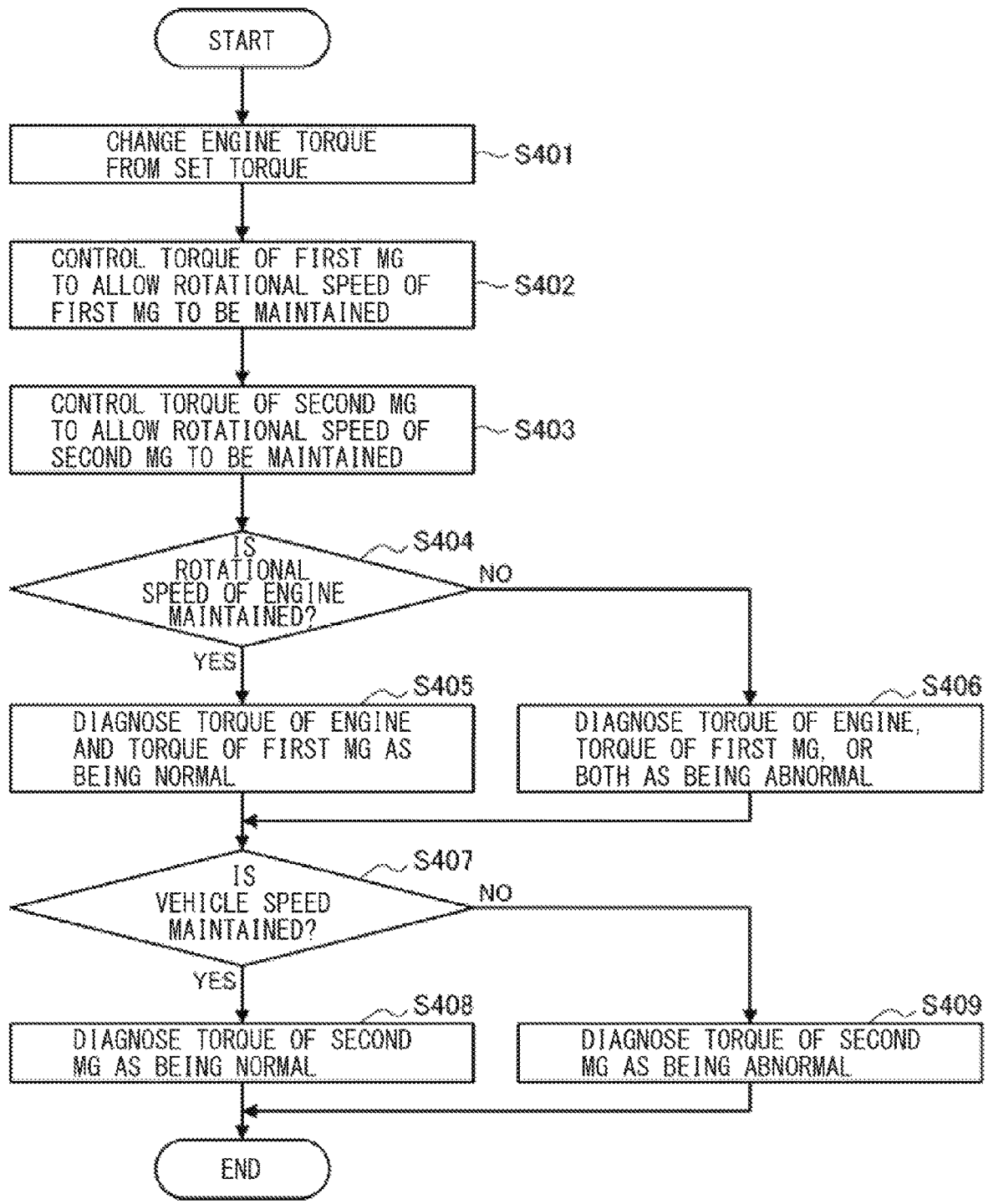
FIG. 9 is a flowchart illustrating an example of a flow of a process in a third diagnosis to be performed by the control apparatus according to one example embodiment of the technology.

FIG. 9 is a flowchart illustrating an example of a flow of a process in the third diagnosis to be performed by the control apparatus 60. A control flow illustrated in FIG. 9 corresponds to that in a process of step S107 in the flowchart of FIG. 4.

In the third diagnosis, as in the first and second diagnoses, the processor 62 may execute the rotational-speed maintenance control, and diagnose, during the execution of the rotational-speed maintenance control, the state of each of the engine 11, the first motor generator 21, and the second motor generator 23 on the basis of the relationship between the respective rotational speeds of the engine 11, the first motor generator 21, and the second motor generator 23. Note that a process corresponding to the rotational-speed maintenance control in the third diagnosis may be in steps S401, S402, and S403 in FIG. 9.

Upon start of the control flow illustrated in FIG. 9, in step S401, the processor 62 may first change an engine torque from the set torque. For example, the processor 62 may reduce the engine torque from the set torque by a predetermined torque (e.g., 10 Nm). Alternatively, for example, the processor 62 may increase the engine torque from the set torque by a predetermined torque (e.g., 10 Nm).

Note that the control flow illustrated in FIG. 9 is similar to the control flow illustrated in FIG. 7 except that the process of step S301 in FIG. 7 is replaced with the above-described process of step S401. Steps S402 to S409 of the control flow illustrated in FIG. 9 are thus similar to steps S302 to S309 of the control flow illustrated in FIG. 7, and therefore descriptions thereof will be omitted.

The rotational-speed maintenance control in the third diagnosis may control the torques of the first motor generator 21 and the second motor generator 23 with the engine 11 being driven, like the rotational-speed maintenance control in the second diagnosis. Here, in the rotational-speed maintenance control in the third diagnosis, torques that the engine 11, the first motor generator 21, and the second motor generator 23 are caused to output may be different from those in the rotational-speed maintenance control in the second diagnosis. In the third diagnosis, it is thus possible to diagnose the state of each piece of equipment in a situation where the engine 11 is driven and where the first motor generator 21 and the second motor generator 23 are outputting torques that are in the negative direction and that have values different from those in the second diagnosis. For example, by performing the third diagnosis in addition to the second diagnosis, it is possible to diagnose a state such as an operation state of a throttle valve, the fuel injection valve, or a fuel pump of the engine 11 over a wide torque range of the engine 11. Further, it is possible to diagnose a state such as a heat resistance or cooling performance of a coil of each motor generator over a wide torque range on the negative direction side of each motor generator.

Figure 10:
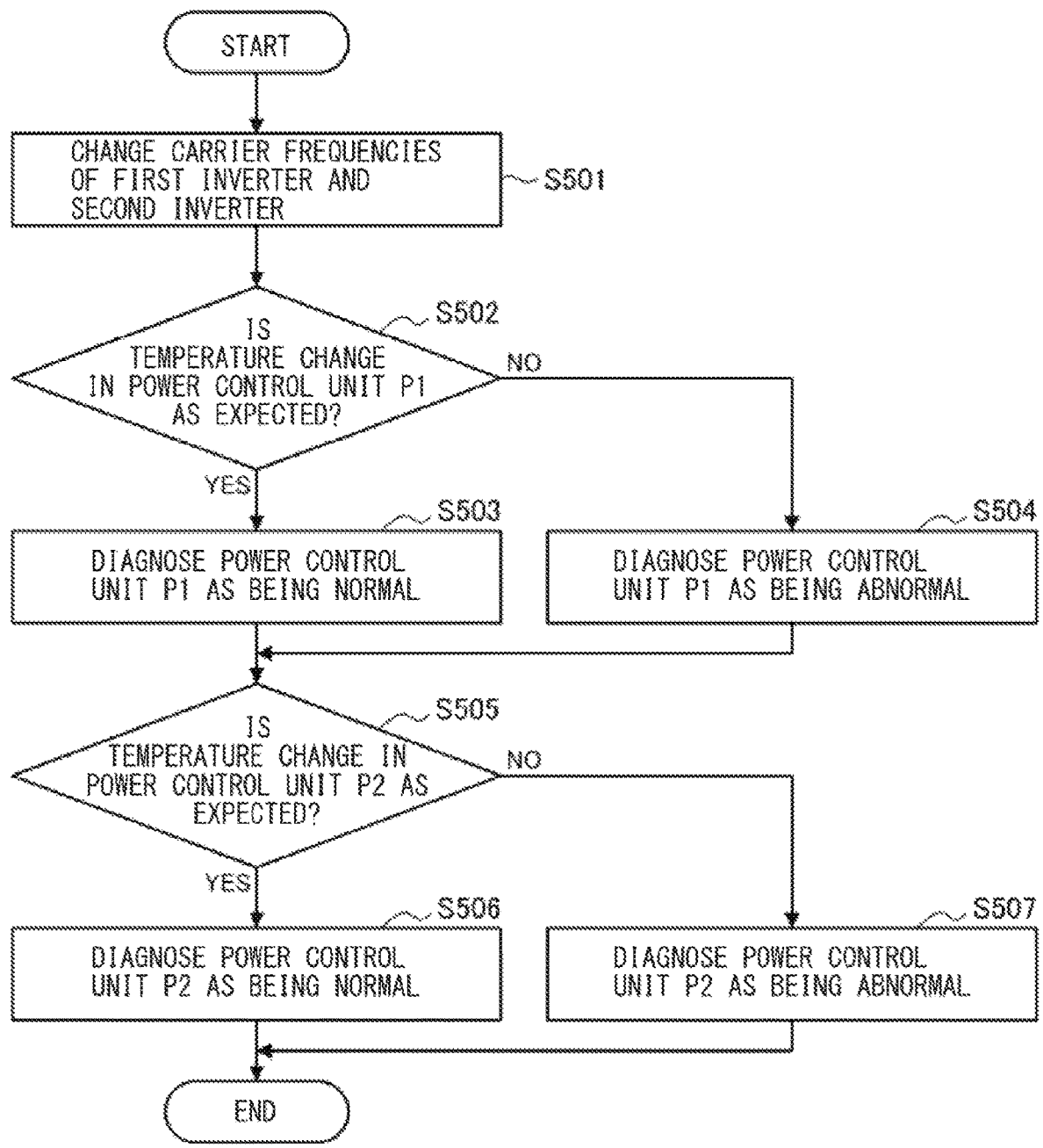
FIG. 10 is a flowchart illustrating an example of a flow of a process in a fourth diagnosis to be performed by the control apparatus according to one example embodiment of the technology.

FIG. 10 is a flowchart illustrating an example of a flow of a process in the fourth diagnosis to be performed by the control apparatus 60. A control flow illustrated in FIG. 10 corresponds to that in a process of step S108 in the flowchart of FIG. 4.

In the fourth diagnosis, unlike the first to third diagnoses, a state of each of the power control units P1 and P2 among the pieces of equipment in the vehicle 1 may be diagnosed.

Upon start of the control flow illustrated in FIG. 10, in step S501, the processor 62 may first change respective carrier frequencies of the first inverter 22 and the second inverter 24. For example, the processor 62 may reduce the carrier frequency of each of the first inverter 22 and the second inverter 24 by a predetermined frequency (e.g., 2 kHz). Alternatively, for example, the processor 62 may increase the carrier frequency of each of the first inverter 22 and the second inverter 24 by a predetermined frequency (e.g., 2 kHz).

After step S501, the processor 62 may determine in step S502 whether a temperature change in the power control unit P1 is as expected.

Here, if the carrier frequency of an inverter is reduced, the frequency with which the inverter performs a switching operation decreases, and a power control unit including the inverter is thus expected to decrease in temperature. Therefore, in a case where the processor 62 has reduced the carrier frequency of one of the inverters by a predetermined frequency (e.g., 2 kHz), for example, if the temperature of one of the power control units that includes the one of the inverters has decreased by a predetermined temperature (e.g., 0.1° C.) or more, the processor 62 may determine that the temperature change in the one of the power control units is as expected.

If the carrier frequency of an inverter is increased, the frequency with which the inverter performs a switching operation increases, and a power control unit including the inverter is thus expected to increase in temperature. Therefore, in a case where the processor 62 has increased the carrier frequency of one of the inverters by a predetermined frequency (e.g., 2 kHz), for example, if the temperature of one of the power control units that includes the one of the inverters has increased by a predetermined temperature (e.g., 0.1° C.) or more, the processor 62 may determine that the temperature change in the one of the power control units is as expected.

If the processor 62 determines in step S502 that the temperature change in the power control unit P1 is as expected (step S502: YES), the processor 62 may cause the control flow to proceed to step S503, and diagnose the power control unit P1 as being normal.

If the processor 62 determines in step S502 that the temperature change in the power control unit P1 is not as expected (step S502: NO), the processor 62 may cause the control flow to proceed to step S504, and diagnose the power control unit P1 as being abnormal.

After step S503 or step S504, the processor 62 may determine in step S505 whether a temperature change in the power control unit P2 is as expected. Note that a determination process of step S505 may be similar to that of step S502.

If the processor 62 determines in step S505 that the temperature change in the power control unit P2 is as expected (step S505: YES), the processor 62 may cause the control flow to proceed to step S506, and diagnose the power control unit P2 as being normal.

If the processor 62 determines in step S505 that the temperature change in the power control unit P2 is not as expected (step S505: NO), the processor 62 may cause the control flow to proceed to step S507, and diagnose the power control unit P2 as being abnormal.

After the process of step S506 or step S507, the processor 62 may cause the control flow illustrated in FIG. 10 to end.

Next, a description will be given of some example effects of the control apparatus 60 according to an example embodiment of the technology.

In the control apparatus 60 according to an example embodiment, the processor 62 diagnoses the state of at least one of the engine 11, the first motor generator 21, or the second motor generator 23 on the basis of the relationship between the rotational speed of the engine 11, the rotational speed of the first motor generator 21, and the rotational speed of the second motor generator 23. This makes it possible to appropriately diagnose the state of at least one of the engine 11, the first motor generator 21, or the second motor generator 23 while allowing the vehicle 1 to keep traveling without stopping. The control apparatus 60 according to an example embodiment thus makes it possible to appropriately diagnose the state of the equipment mounted on the vehicle 1.

In one example, in the control apparatus 60 according to an example embodiment, the processor 62 may diagnose, during the execution of the rotational-speed maintenance control, the state of each of the engine 11 and the first motor generator 21 on the basis of whether the rotational speed of the engine 11 is maintained. For example, in the first diagnosis described above, a diagnosis may be made as to whether each of the friction of the engine 11 and the torque of the first motor generator 21 is abnormal, as the state of each of the engine 11 and the first motor generator 21. Further, for example, in each of the second and third diagnoses described above, a diagnosis may be made as to whether each of the torque of the engine 11 and the torque of the first motor generator 21 is abnormal, as the state of each of the engine 11 and the first motor generator 21. As described above, if attention is focused on the relationship between the respective rotational speeds of the engine 11, the first motor generator 21, and the second motor generator 23, in the case where the rotational speed of the engine 11 is not maintained during the execution of the rotational-speed maintenance control, it is possible to diagnose the engine 11, the first motor generator 21, or both as being abnormal. It is thus possible to appropriately diagnose the state of each of the engine 11 and the first motor generator 21 on the basis of the relationship between the respective rotational speeds of the engine 11, the first motor generator 21, and the second motor generator 23.

In one example, in the control apparatus 60 according to an example embodiment, the processor 62 may diagnose, during the execution of the rotational-speed maintenance control, the state of the second motor generator 23 on the basis of whether the vehicle speed of the vehicle 1 is maintained. For example, in each of the first to third diagnoses described above, a diagnosis may be made as to whether the torque of the second motor generator 23 is abnormal, as the state of the second motor generator 23. As described above, if attention is focused on the relationship between the respective rotational speeds of the engine 11, the first motor generator 21, and the second motor generator 23, in the case where the vehicle speed is not maintained during the execution of the rotational-speed maintenance control, it is possible to diagnose the second motor generator 23 as being abnormal. It is thus possible to appropriately diagnose the state of the second motor generator 23 on the basis of the relationship between the respective rotational speeds of the engine 11, the first motor generator 21, and the second motor generator 23.

In one example, the rotational-speed maintenance control to be performed by the control apparatus 60 according to an example embodiment may include control that causes fuel to the engine 11 to be cut off. By diagnosing the state of at least one of the engine 11, the first motor generator 21, or the second motor generator 23 during the execution of the rotational-speed maintenance control that causes fuel to the engine 11 to be cut off, it is possible to diagnose the state of each piece of equipment in the situation where the engine 11 stops and where the first motor generator 21 and the second motor generator 23 are outputting torques in the positive direction.

In one example, the rotational-speed maintenance control to be performed by the control apparatus 60 according to an example embodiment may include control that causes the engine 11 to be driven. By diagnosing the state of at least one of the engine 11, the first motor generator 21, or the second motor generator 23 during the execution of the rotational-speed maintenance control that causes the engine 11 to be driven, it is possible to diagnose the state of each piece of equipment in the situation where the engine 11 is driven and where the first motor generator 21 and the second motor generator 23 are outputting torques in the negative direction.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, a description has been given above of an example in which the first diagnosis, the second diagnosis, the third diagnosis, and the fourth diagnosis are performed as the diagnosis of the vehicle 1, with reference to FIG. 4. However, the content of the diagnosis of the vehicle 1 is not limited to the foregoing example. In one example, one or more, but not all, of the first to fourth diagnoses may be omitted. For example, only the first diagnosis may be performed, or only the first and second diagnoses may be performed. Alternatively, another diagnosis may be performed in addition to the first to fourth diagnoses. For example, after the third diagnosis, the rotational-speed maintenance control may be performed with the torque of the engine 11 changed further, and during execution of such a rotational-speed maintenance control, the state of each piece of equipment may be diagnosed in a manner similar to that in, e.g., the third diagnosis. Further, for example, after the fourth diagnosis, the carrier frequencies of the inverters may be changed further and the states of the power control units may be diagnosed in a manner similar to that in, e.g., the fourth diagnosis.

The processor 62 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 62. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 62 illustrated in FIG. 3.

The invention claimed is:

1. A control apparatus configured to control a vehicle, the vehicle including an engine, a generator configured to generate electric power by using motive power outputted from the engine, and a drive motor coupled to a drive wheel, the engine, the generator, and the drive motor being coupled to each other via a planetary gear mechanism, the control apparatus comprising
    a processor configured to diagnose a state of at least one of the engine, the generator, or the drive motor on a basis of a relationship between a rotational speed of the engine, a rotational speed of the generator, and a rotational speed of the drive motor.

2. The control apparatus according to claim 1, wherein the processor is configured to:
    execute a rotational-speed maintenance control that controls an operation of each of the engine, the generator, and the drive motor to allow each of the rotational speed of the engine, the rotational speed of the generator, and the rotational speed of the drive motor to be maintained; and
    diagnose, during the execution of the rotational-speed maintenance control, a state of each of the engine and the generator on a basis of whether the rotational speed of the engine is maintained.

3. The control apparatus according to claim 1, wherein the processor is configured to:
    execute a rotational-speed maintenance control that controls an operation of each of the engine, the generator, and the drive motor to allow each of the rotational speed of the engine, the rotational speed of the generator, and the rotational speed of the drive motor to be maintained; and
    diagnose, during the execution of the rotational-speed maintenance control, a state of the drive motor on a basis of whether a vehicle speed of the vehicle is maintained.

4. The control apparatus according to claim 2, wherein the processor is configured to:
    execute a rotational-speed maintenance control that controls an operation of each of the engine, the generator, and the drive motor to allow each of the rotational speed of the engine, the rotational speed of the generator, and the rotational speed of the drive motor to be maintained; and
    diagnose, during the execution of the rotational-speed maintenance control, a state of the drive motor on a basis of whether a vehicle speed of the vehicle is maintained.

5. The control apparatus according to claim 2, wherein the rotational-speed maintenance control comprises control that causes fuel to the engine to be cut off.

6. The control apparatus according to claim 3, wherein the rotational-speed maintenance control comprises control that causes fuel to the engine to be cut off.

7. The control apparatus according to claim 4, wherein the rotational-speed maintenance control comprises control that causes fuel to the engine to be cut off.

8. The control apparatus according to claim 2, wherein the rotational-speed maintenance control comprises control that causes the engine to be driven.

9. The control apparatus according to claim 3, wherein the rotational-speed maintenance control comprises control that causes the engine to be driven.

10. The control apparatus according to claim 4, wherein the rotational-speed maintenance control comprises control that causes the engine to be driven.

11. The control apparatus according to claim 5, wherein the rotational-speed maintenance control comprises control that causes the engine to be driven.

12. The control apparatus according to claim 6, wherein the rotational-speed maintenance control comprises control that causes the engine to be driven.

13. The control apparatus according to claim 7, wherein the rotational-speed maintenance control comprises control that causes the engine to be driven.

\* \* \* \* \*